(12) United States Patent
Bang et al.

(10) Patent No.: US 11,716,367 B2
(45) Date of Patent: Aug. 1, 2023

(54) APPARATUS FOR MONITORING MULTICAST GROUP

(71) Applicant: UNIONPLACE CO., LTD., Seoul (KR)

(72) Inventors: Seongcheol Bang, Bucheon-si (KR); Jaewon Cha, Seoul (KR); Seungchul Kwak, Goyang-si (KR)

(73) Assignee: UNIONPLACE CO., LTD., Seoul (KR)

( * ) Notice: Subject to any disclaimer, the term of this patent is extended or adjusted under 35 U.S.C. 154(b) by 188 days.

(21) Appl. No.: 16/823,466

(22) Filed: Mar. 19, 2020

(65) Prior Publication Data

US 2020/0336523 A1    Oct. 22, 2020

(30) Foreign Application Priority Data

Apr. 18, 2019  (KR) .................. 10-2019-0045444

(51) Int. Cl.
*H04L 65/611*  (2022.01)
*H04L 9/06*    (2006.01)
*H04L 9/32*    (2006.01)

(52) U.S. Cl.
CPC .......... *H04L 65/611* (2022.05); *H04L 9/0643* (2013.01); *H04L 9/3242* (2013.01)

(58) Field of Classification Search
CPC ... H04L 9/3242; H04L 9/0833; H04L 63/123; H04L 65/4076; H04L 9/0643
USPC ........................................................ 709/231
See application file for complete search history.

(56) References Cited

U.S. PATENT DOCUMENTS

| | | | | |
|---|---|---|---|---|
| 7,434,047 B2* | 10/2008 | Sharma | ............... | H04W 12/122 713/163 |
| 2005/0044356 A1* | 2/2005 | Srivastava | .......... | H04L 63/0281 713/163 |
| 2005/0097317 A1* | 5/2005 | Trostle | ............... | H04L 63/0807 713/163 |
| 2006/0174116 A1* | 8/2006 | Balfanz | ................. | H04L 69/329 713/168 |
| 2015/0071441 A1* | 3/2015 | Hinz | ..................... | H04L 9/3247 380/270 |

FOREIGN PATENT DOCUMENTS

| | | | | |
|---|---|---|---|---|
| CN | 103098415 A | * | 5/2013 | ............. H04L 12/18 |
| JP | 2003501881 A | * | 1/2003 | |
| JP | 2008187626 A | * | 8/2008 | |

(Continued)

*Primary Examiner* — Mohamed A. Wasel
*Assistant Examiner* — John Fan
(74) *Attorney, Agent, or Firm* — Stein IP, LLC

(57) ABSTRACT

An apparatus for monitoring a multicast group is provided. The apparatus includes a storage, a receiver and an operation processor. The storage is configured to store first data including a first authenticated message authenticated as being published by a publisher of the multicast group to n-th data including an n-th authenticated message authenticated as being published by the publisher where n is a natural number of 2 or more. The receiver is configured to receive status data including a first propagation message to be delivered to the multicast group. Further, the operation processor is configured to generate monitoring information including status information of the multicast group by using the status data and the first to n-th data.

18 Claims, 12 Drawing Sheets

(56) References Cited

FOREIGN PATENT DOCUMENTS

| | | | |
|---|---|---|---|
| JP | 2012506655 A | * | 3/2015 |
| KR | 10-2003-0049470 A | | 6/2003 |
| KR | 10-2014-0006996 A | | 1/2014 |
| KR | 10-2016-0003783 A | | 1/2016 |
| KR | 10-2017-0089747 A | | 8/2017 |
| KR | 10-1840430 B1 | | 3/2018 |
| KR | 10-2018-0080410 A | | 7/2018 |
| KR | 10-1940983 B1 | | 1/2019 |
| KR | 10-2008670 B1 | | 8/2019 |
| WO | WO-2008138196 A1 | * 11/2008 | ......... H04L 63/1408 |

* cited by examiner

FIG. 3

| SERIAL NUMBER | MESSAGE | MESSAGE AUTHENTICATION CODE |
|---|---|---|

FIG. 4

| AUTHENTICATED MESSAGE | REFERENCE COUNT |
|---|---|

FIG. 5

| 51 | MESSAGE #51 | MAC #51 | 0 |
|---|---|---|---|
| 52 | MESSAGE #52 | MAC #52 | 0 |
| 53 | MESSAGE #53 | MAC #53 | 0 |
| ... | ... | ... | ... |
| 150 | MESSAGE #150 | MAC #150 | 0 |

FIG. 7

| FIRST PROPAGATION MESSAGE | DEVICE IDENTIFICATION INFORMATION | TIME AT WHICH FIRST PROPAGATION MESSAGE IS RECEIVED |
|---|---|---|
| SECOND PROPAGATION MESSAGE | DEVICE IDENTIFICATION INFORMATION | TIME AT WHICH SECOND PROPAGATION MESSAGE IS RECEIVED |
| ... | ... | |
| M-TH PROPAGATION MESSAGE | DEVICE IDENTIFICATION INFORMATION | TIME AT WHICH M-TH PROPAGATION MESSAGE IS RECEIVED |

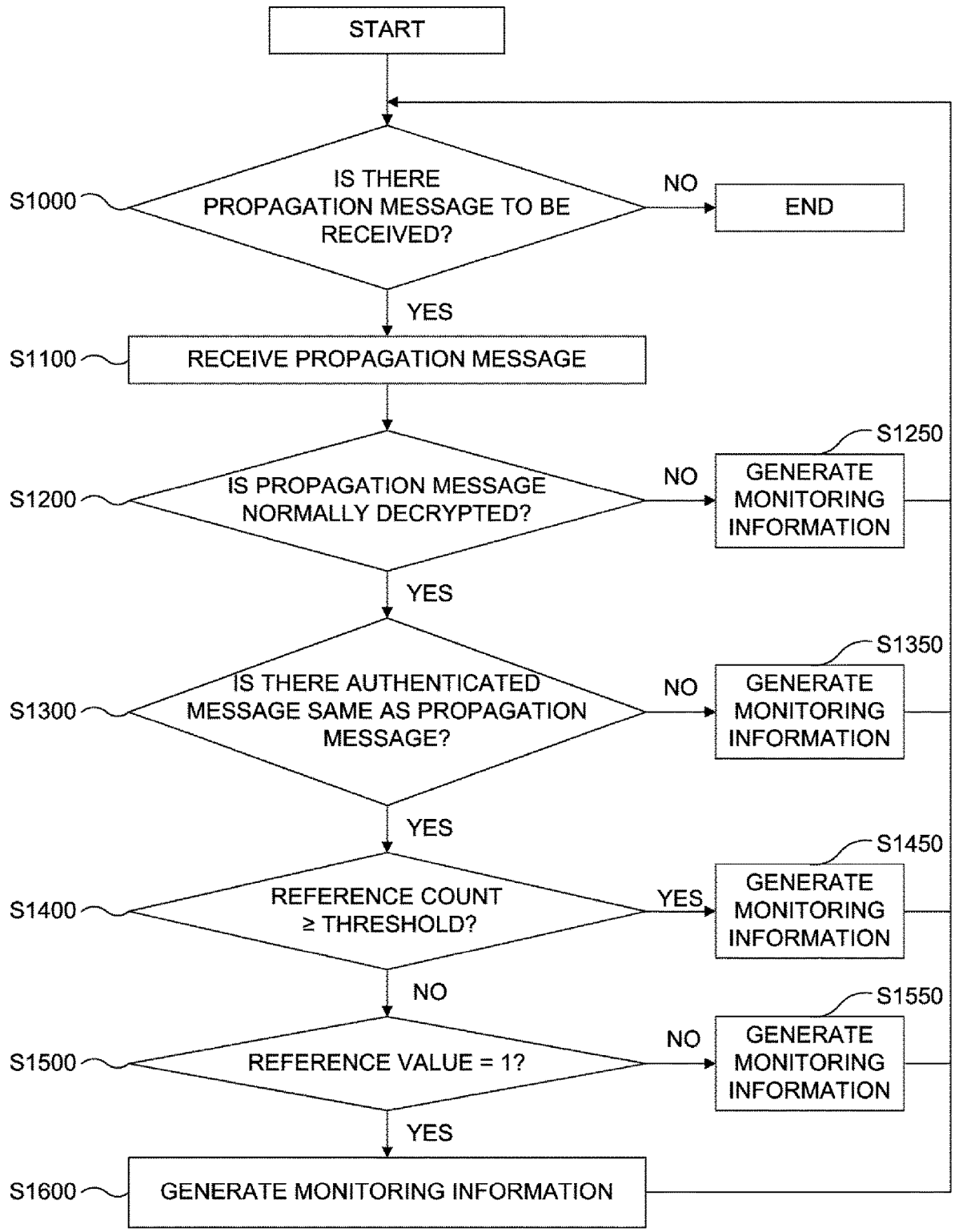

APPARATUS FOR MONITORING MULTICAST GROUP

CROSS-REFERENCE TO RELATED PATENT APPLICATION

This application claims priority under 35 U.S.C. § 119 of Korean Patent Application No. 10-2019-0045444, filed on Apr. 18, 2019, in the Korean Intellectual Property Office, the entire contents of which are hereby incorporated by reference.

BACKGROUND

1. Field

The present disclosure relates to an apparatus for monitoring a multicast group; and more particularly, to an apparatus for monitoring a multicast group, which is capable of monitoring various abnormal conditions that occurs in the multicast group.

The technique of the present disclosure was developed with the support of the research project of the Ministry of Science & ICT, which is managed by the Institute for Information & Communication Technology Promotion (IITP) (Project Title: "Development of next generation fusion Open-CPS security technique based on complex Secure-OS for large scale (5 million) IIoT security", Project Number: 2019-0-00160).

2. Description of the Related Art

A multicast group includes a plurality of devices. In the multicast group, one of the plurality of devices is designated as a publisher and the other devices are designated as subscribers. According to the publisher-subscriber pattern, the publisher generally does not know which subscribers will receive data (hereinafter referred to as "messages"), and the subscribers may receive the messages that are of interest without knowledge of the publisher. The publisher-subscriber pattern may be used for sending messages to subscribers from a publisher, for example, in a multicast group including a plurality of devices used for wireless communication. Alternatively, the publisher-subscriber pattern may also be used for sending messages to subscribers from a publisher, for example, in a multicast group including a plurality of devices used for Internet of Things (IoT) communication.

As described above, the publisher does not know which subscribers will receive the message, so that an unauthorized device may receive the message. Thus, in order to prevent devices other than devices in the multicast group, i.e., unauthorized devices, from receiving messages, encryption keys (hereinafter referred to as "group key") for identifying devices in the multicast group may be used. The publisher encrypts the messages using the group key and sends the encrypted messages to the subscribers, and the subscribers decrypt the received encrypted messages using the group key. As an example of the group key, a symmetric key may be used. For example, Korean Patent Application Publication No. 10-2014-0006996 (Patent Document 1) entitled "Traffic encryption key management for machine-to-machine multicast Group" filed on Feb. 28, 2012, by LG Electronics INC. and published on Jan. 16, 2014, discloses a method of updating a group traffic key (that is, "group key" in the present disclosure) used to encrypt and decrypt multicast data (i.e., messages).

As described above, the subscribers may receive the messages that are of interest without knowledge of the publisher. Thus, even if an unauthorized device publishes and sends messages, the subscribers may receive those messages. In this connection, a message authentication code (generally referred to as "MAC") may be used to prevent the unauthorized device from sending messages and to prevent the subscribers from receiving the messages by misunderstanding that the messages are sent by the authorized publisher. For example, Korean Patent Application Publication No. 10-2017-0089747 (Patent Document 2) entitled "System and method for authentication of things" filed on Oct. 17, 2016, by LG Electronics INC. and published on Aug. 4, 2017, discloses a method of using a message authentication code for authentication in the Internet of Things. For example, the message authentication code can be generated using a hash function. The publisher adds the message authentication code to the message and then sends the message with the message authentication code to the subscriber. The subscriber compares a result of a hash operation on the received message using the hash function with the message authentication code included in the received message. If the operation result and the message authentication code are identical, the message can be regarded as the one that is sent by the authorized publisher.

For example, both of the group key and the message authentication code may be used to prevent the unauthorized device from receiving a message and also prevent the unauthorized device from publishing a message.

However, even if both of the group key and the message authentication code are used, the following drawbacks may occur in the multicast group.

a) Sending (Transmitting) Messages from Unauthorized Devices

A malicious message, arbitrarily generated by a device that is not aware of the group key and/or the message authentication code, may be transmitted to the multicast group. When a normal subscriber in the multicast group receives the malicious message, the normal subscriber processes the received message using the group key and the message authentication code. Therefore, the normal subscriber can confirm that the received message is the malicious message. However, in order to handle the malicious message, system resources of the normal subscriber are wasted.

b) Tampering with Messages

The subscribers in the multicast group have the group key. Due to the hacker's attack or the malicious intent, there may be a malicious subscriber among the subscribers. The malicious subscriber may tamper with a message, encrypt the tampered message using the group key, and add the message authentication code to the tampered message to thereby transmit such tampered message to the normal subscriber in the multicast group. The tampered message is also encrypted using the group key and further provided with the message authentication code. Thus, even though the normal subscriber receives the tampered message, the normal subscriber cannot distinguish whether the received message is sent by the authenticated publisher or by the malicious subscriber.

c) Replay Attack of Messages

The malicious subscriber subscribed to the multicast group or the malicious device that is not subscribed but joined to the multicast group may repeatedly replay messages. When the malicious subscriber or the malicious device repeatedly replays the messages, the normal subscriber has to receive and process the messages repeatedly transmitted by the malicious subscriber or the malicious device. A repeatedly replaying message is the normal message. However, in order to process the messages repeatedly transmitted by the malicious subscriber or the malicious device, system resources of the normal subscriber are wasted, and the normal subscriber may not perform the normal operation.

d) Loss of Messages

In the multicast group, messages are generally transmitted on User Datagram Protocol (UDP). Therefore, unlike the case where messages are transmitted based on Transmission Control Protocol (TCP), some of the message may be lost. Specifically, in the case when the publisher sends 100 messages to the subscriber, some of the 100 messages may not be sent to the subscriber. The normal subscriber cannot easily check the loss of messages even if some of the messages are lost.

e) Difficulty in Verifying Data Integrity of Messages

The subscriber in the multicast group cannot easily confirm that a received message is the normal message sent by an authenticated publisher. In other words, even if a message has a problem due to various attacks on the network environment, the subscriber cannot easily verify the integrity of the message.

f) Difficulty in Checking Status in the Multicast Group

It is difficult for an administrator or management apparatus of the multicast group to easily determine whether a message transmitted or received in the multicast group is tampered with, is hacked or has a problem over network transmission.

RELATED ART

Patent Document 1: Korean Patent Application Publication No. 10-2014-0006996
Patent Document 2: Korean Patent Application Publication No. 10-2017-0089747

SUMMARY

In view of the above, the present disclosure provides a multicast group monitoring apparatus capable of monitoring various abnormal conditions that occurs in the multicast group such as the transmission of messages from unauthorized devices, the tampering of messages, the replay of messages, the loss of messages, and the difficulty in verifying the data integrity of messages and the difficulty in checking status in the multicast group.

In accordance with an aspect of the present disclosure, there is provided an apparatus for monitoring a multicast group, including: a storage configured to store first data to n-th data respectively including a first authenticated message to a n-th authenticated message authenticated as being published by a publisher of the multicast group, where n is a natural number greater than or equal to 2; a receiver configured to receive status data including a first propagation message to be delivered to the multicast group; and an operation processor configured to generate monitoring information including status information of the multicast group by using the status data and the first data to the n-th data.

In accordance with the aspect of the present disclosure, it is possible to provide the multicast group monitoring apparatus capable of monitoring various abnormal conditions that occurs in the multicast group such as the transmission of messages from unauthorized devices, the tampering of messages, the replay of messages, the loss of messages, and the difficulty in checking status in the multicast group.

BRIEF DESCRIPTION OF THE DRAWINGS

FIG. 3 shows an example of an authenticated message in the multicast group monitoring apparatus according to the embodiment of the present disclosure.

FIG. 4 shows an example of data stored in a storage in the multicast group monitoring apparatus according to the embodiment of the present disclosure.

FIG. 5 shows examples of first to n-th data stored in the storage in the multicast group monitoring apparatus according to the embodiment of the present disclosure.

FIG. 7 shows an example of status data in the multicast group monitoring apparatus according to the embodiment of the present disclosure.

FIG. 14 is a flowchart showing an example of a process of generating monitoring information by an operation processor in the multicast group monitoring apparatus according to the embodiment of the present disclosure.

DETAILED DESCRIPTION

Figure 1:
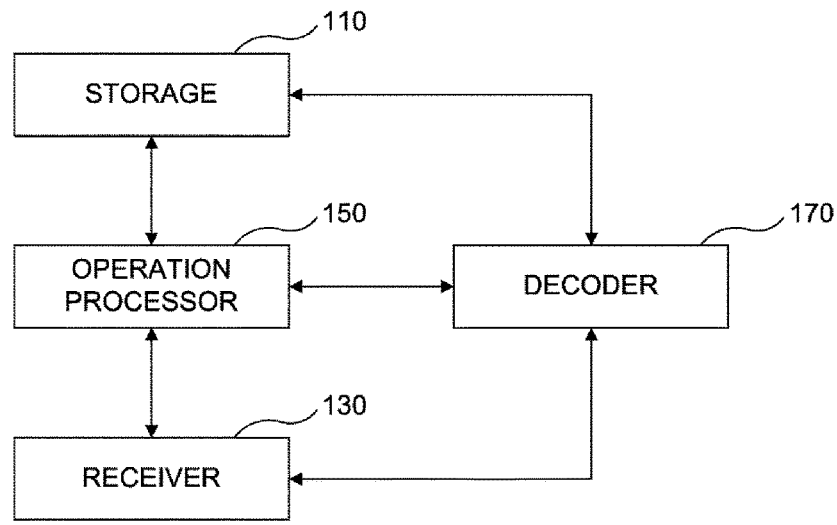
FIG. 1 shows an exemplary configuration of a multicast group monitoring apparatus according to an embodiment of the present disclosure.

Hereinafter, embodiments of an apparatus for monitoring a multicast group according to the techniques of the present disclosure will be described in detail with reference to the accompanying drawings. Meanwhile, in the drawings for describing the embodiments of the techniques of the present disclosure, only a part of the practical configurations may be illustrated, a part of the practical configurations may be omitted or changed, and relative dimensions and proportions of parts therein may be exaggerated or reduced in size for the sake of convenience of description.

Embodiments

Figure 2A:
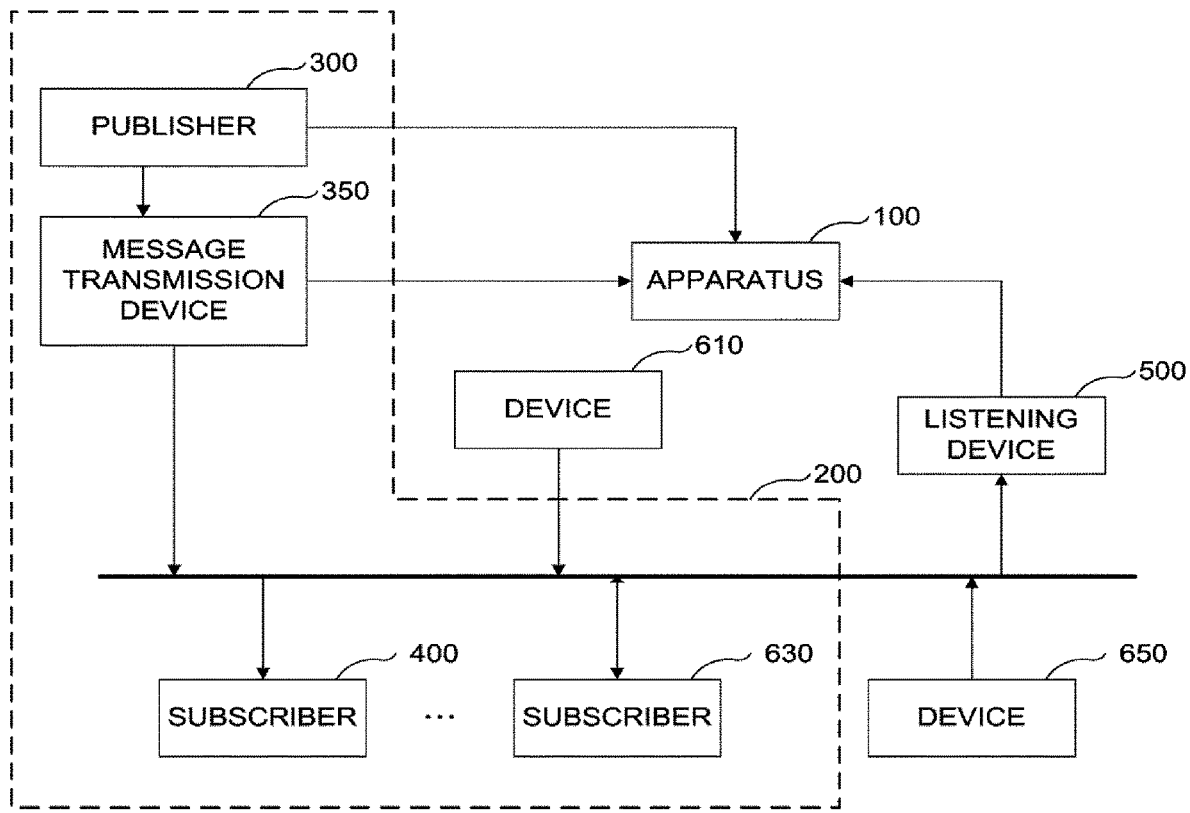
FIGS. 2A and 2B show an example of a system environment to which the multicast group monitoring apparatus according to the embodiment of the present disclosure is applied.
Figure 2B:
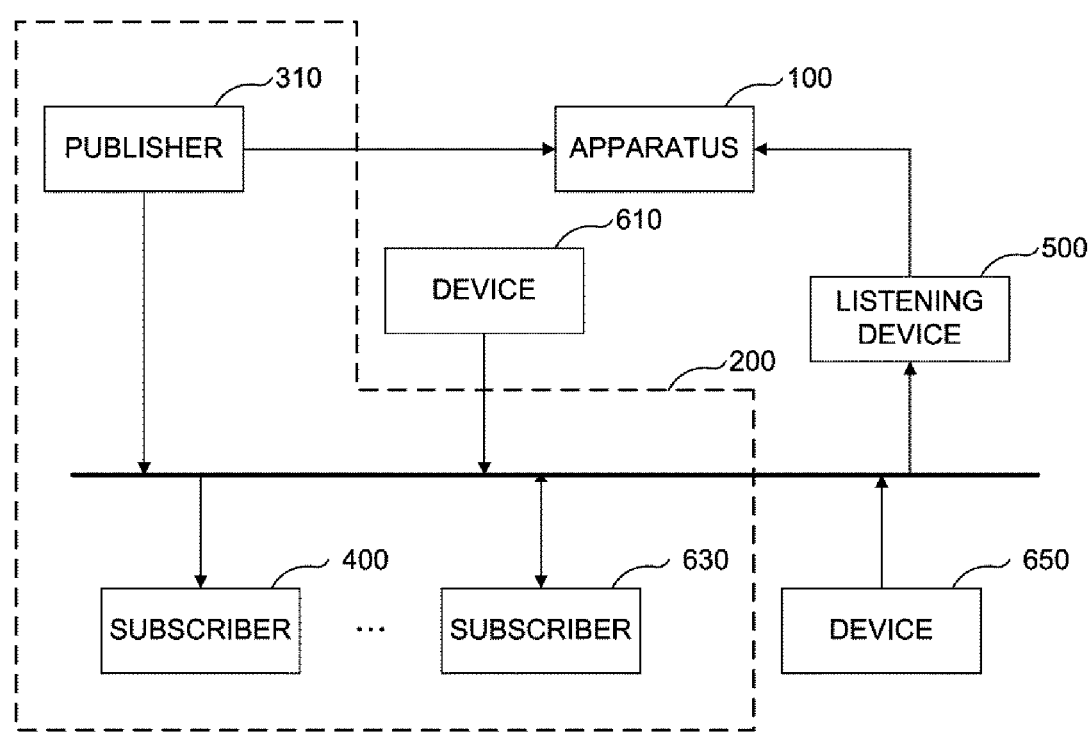

FIG. 1 shows an exemplary configuration of an apparatus for monitoring a multicast group according to an embodiment of the present disclosure. FIGS. 2A and 2B show an example of a system environment to which the apparatus for monitoring the multicast group according to the embodiment is applied.

Referring to FIG. 1, a multicast group monitoring apparatus 100 includes a storage 110, a receiver 130, and an operation processor 150. In addition, the multicast group monitoring apparatus 100 may further include a decoder 170. Hereinafter, the multicast group monitoring apparatus 100 is simply referred to as "apparatus 100" and detailed description of the apparatus 100 will be described later.

Referring to FIG. 2A, a system environment to which the multicast group monitoring apparatus is applied includes the apparatus 100; a multicast group 200 including a publisher 300, a message transmission device 350, a subscriber 400 and a subscriber 630; a device 610; a device 650;

and a listening device 500.

The publisher 300 is configured to generate a message to be sent to subscribers such as the subscriber 400 and the subscriber 630 in the multicast group.

The message transmission device 350 is configured to receive a message from the publisher 300, generate an authenticated message based on the message, and transmit the authenticated message to the apparatus 100. In addition, the message transmission device 350 also transmits the authenticated message to the subscriber 400 and the subscriber 630.

Preferably, the message transmission device 350 may generate the authenticated message by assigning a serial number to the message and encrypting the message using a group key and a message authentication code of the multicast group 200. Instead, the message transmission device 350 may generate the authenticated message by assigning a serial number to the message and encrypting the message using only the group key of the multicast group 200. Alternatively, the message transmission device 350 may generate the authenticated message by simply assigning a serial number to the message. Further, alternatively, the message transmission device 350 may generate the authenticated message by only encrypting the message using the group key and the message authentication code of the multicast group 200, or the message transmission device 350 may generate the authenticated message by only encrypting the message using the group key of the multicast group 200. As another option, the message transmission device 350 may generate the message itself as the authenticated message without encrypting the message.

Hereinafter, the embodiments of the present disclosure will be described based on an example in which the message transmission device 350 generates the authenticated message by assigning a serial number to the message and encrypting the message using the group key and the message authentication code of the multicast group 200. However, the present disclosure is not limited to the above example.

As another example of the system environment to which the multicast group monitoring apparatus is applied, FIG. 2B shows the system environment in which the multicast group 200 includes the publisher 310 having the publisher 300 and the message transmission device 350 as one unit. Since the publisher 310 may refer to the configuration of the publisher 300 and the message transmission device 350, the detailed description thereof will be omitted.

FIG. 3 shows an example of the authenticated message in the multicast group monitoring apparatus according to the embodiment of the present disclosure.

Referring to FIG. 3, the authenticated message includes a serial number, a message and a message authentication code. The serial number is information indicating the sequential order in which the messages are generated. For example, the serial number indicates the sequential order of the messages generated by the publisher 300 in the multicast group 200. Alternatively, the serial number may indicate the sequential order of the authenticated messages generated by the message transmission device 350. Further, alternatively, the serial number may indicate the sequential order of the authenticated messages generated by the publisher 310.

The message may be, e.g., information generated by the publisher 300 or the publisher 310.

The message authentication code may be, e.g., authentication information generated using a hash function.

At least one among the serial number, the message, and the message authentication code may be encrypted using the group key of the multicast group 200. For example, the message and the message authentication code may be encrypted without encrypting the serial number, or all of the serial number, the message and the message authentication code may be encrypted.

Further, as described above, the authenticated message may include only the serial number and the message, only the message and the message authentication code, or only the message.

Referring back to FIG. 2A, the subscriber 400 is a normal device in the multicast group 200. In other words, the subscriber 400 receives an authenticated message from the message transmission device 350 and performs a signal processing. For example, if the multicast group 200 uses a group key and a message authentication code, the subscriber 400 stores the group key of the multicast group 200 and may decrypt the authenticated message using the group key and the message authentication code. As another example, if the multicast group 200 uses an unencrypted authenticated message, the subscriber 400 may receive the unencrypted authenticated message.

The listening device 500 is a device subscribed or joined to the multicast group 200. The listening device 500 receives a propagation message to be delivered to the multicast group 200 and transmits status data including the received propagation message to the apparatus 100. For example, if the multicast group 200 uses a group key and a message authentication code and the listening device 500 is subscribed to the multicast group 200, the listening device 500 may decrypt the propagation message by using the group key and the message authentication code. As another example, if the multicast group 200 uses a group key and a message authentication code and the listening device 500 is joined to the multicast group 200, the listening device 500 may not be aware of the group key and the message authentication code but can receive the propagation message by using network information of the multicast group 200. For example, by using the network information such as the IP address and the port number of the multicast group 200, the listening device 500 may receive the propagation message.

The device 610 is a device that is not subscribed to the multicast group 200 and transmits an unauthenticated message to the multicast group 200 through a hacker or a malicious attacker. That is, the device 610 transmits an unauthenticated message to a multicast group even though the device 610 does not serve as the message transmission device 350 or the publisher 310.

The device (subscriber) 630 is a device that is subscribed to the multicast group 200 but transmits a message tampered with by a hacker or a malicious attacker to the multicast group 200. For example, when the multicast group 200 uses the group key and the message authentication code, since the device 630 is subscribed to the multicast group 200, the device 630 may encrypt and transmit the tampered message by using the group key and the message authentication code.

The device 650 is a device that is not subscribed but joined to the multicast group 200. The device 650 is a device capable of receiving the propagation message to be delivered to the multicast group 200 and repeatedly replaying the propagation message.

Referring to FIG. 1, the storage 110 is configured to store first data to n-th data. The first data includes a first authenticated message authenticated as being published by the publisher 300 or the publisher 310 of the multicast group 200, and the n-th data includes an n-th authenticated message authenticated as being published by the publisher (e.g., the publisher 300 shown in FIG. 2). Here, 'n' is a natural number greater than or equal to 2 and is determined based on the capacity of the storage 110. For example, 'n' may be equal to 100.

The first to n-th authenticated messages have, for example, the exemplary constituent shown in FIG. 3.

FIG. 4 shows an example of the data stored in the storage in the multicast group monitoring apparatus according to the embodiment of the present disclosure.

Referring to FIG. 4, the data includes an authenticated message. Further, the data may further include a reference count.

As described above, the authenticated message may include the serial number, the message, and the message authentication code. Alternatively, the authenticated message may include only the serial number and the message, or may include only the message and the message authentication code. Further, alternatively, the authenticated message may include only the message.

Further, as described above, at least one among the serial number, the message, and the message authentication code may be stored in an encrypted form. Further, at least one among the serial number, the message, and the message authentication code may be stored in an unencrypted form. The reference count may be stored in an unencrypted form. Further, even when the authenticated message is transmitted to the apparatus 100 in an encrypted form, the storage 110 may store the authenticated message in a decrypted form by, for example, the decoder 170 to be described later.

FIG. 5 shows examples of the first to n-th data stored in the storage in the multicast group monitoring apparatus according to the embodiment of the present disclosure.

Referring to FIG. 5, the first data includes a first authenticated message. The first authenticated message has a serial number "51," a message "message #51" and a message authentication code "MAC #51." The first data may further include reference count "0." The second data includes a second authenticated message. The second authenticated message has a serial number "52," a message "message #52" and a message authentication code "MAC #52." The second data may further include reference count "0." For example, when "n" is 100, the n-th data includes an n-th authenticated message. The n-th authenticated message has a serial number "150," a message "message #150" and a message authentication code "MAC #150." The n-th data may further include reference count "0". In the example shown in FIG. 5, the reference count is set to "0," but the reference count may be increased by the operation processor 150 to be described later.

Figure 6:
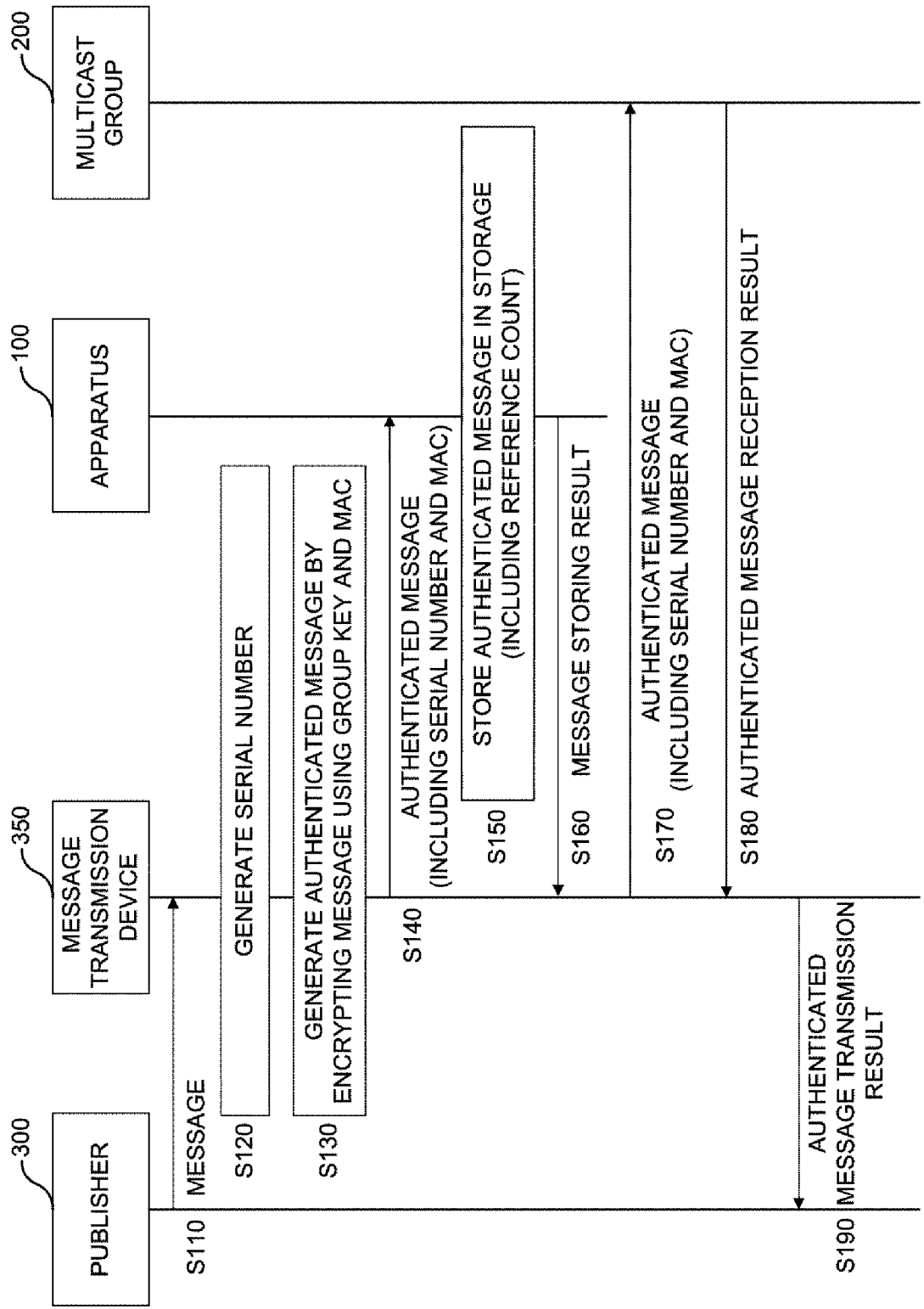
FIG. 6 shows a process of storing the authenticated message in the multicast group monitoring apparatus according to the embodiment of the present disclosure.

FIG. 6 shows a process of storing the authenticated message in the multicast group monitoring apparatus according to the embodiment of the present disclosure.

Referring to FIG. 6, the publisher 300 generates a message and transmits the message to the message transmission device 350 (step S110). When the message transmission device 350 receives the message from the publisher 300, the message transmission device 350 generates a serial number based on the sequential order in which the message is received (step S120). The message transmission device 350 generates an authenticated message by encrypting the message using the group key and the message authentication code (step S130). The authenticated message may include the serial number, the message and the message authentication code as described above. The message transmission device 350 transmits the generated authenticated message including the serial number, the message and the message authentication code to the apparatus 100 (step S140). When the apparatus 100 receives the authenticated message from the message transmission device 350, the apparatus 100 stores the authenticated message in the storage 110 (step S150). That is, the apparatus 100 stores the authenticated message as data in the storage 110. The data may further include reference count as described above. When the capacity of the storage 110 is insufficient, the apparatus 100 may delete the oldest data among the data stored in the storage 110 and store the received authenticated message as the new data in the storage 110. The apparatus 100 transmits the result of storing the authenticated message (message storing result) to the message transmission device 350 (step S160). The message transmission device 350 transmits the authenticated message to the multicast group 200 when receiving the message storing result from the apparatus 100 (step S170). Then, when the message transmission device 350 receives the result of receiving the authenticated message (authenticated message reception result) from the multicast group 200 (step S180), the message transmission device 350 transmits the result of transmitting the authenticated message to the publisher 300 (step S190).

It is preferred that the apparatus 100, more particularly, the operation processor 150 or the storage 110 is connected to the message transmission device 350 by using communication protocol having a communication speed that is faster than a communication speed at which the propagation message is delivered in the multicast group 200. For example, the apparatus 100 is connected to the message transmission device 350 using the communication protocol of, e.g., a unicast type. Therefore, the authenticated message may be stored in the message transmission device 350 before the authenticated message is transmitted into the multicast group 200. Meanwhile, the apparatus 100 and the message transmission device 350 may be implemented as one unit by integrating them into one system. That is, a part of the system may operate as the message transmission device 350 and another part of the system may operate as the apparatus 100. In this case, the apparatus 100 and the message transmission device 350 may be connected by using a communication method capable of performing a high speed communication such as a shared memory.

Although the process of storing the authenticated message has been described with reference to FIG. 6, the present disclosure is not limited thereto. For example, the message transmission device 350 may transmit the authenticated message to the multicast group 200 in parallel with the transmission of the authenticated message to the apparatus 100. Further, for example, the publisher 310 may transmit the authenticated message instead of the message transmission device 350. In addition, the authenticated message may not be encrypted, and a serial number may not be assigned thereto.

Referring back to FIG. 1, the receiver 130 receives the status data including a first propagation message to be delivered to the multicast group 200.

FIG. 7 shows an example of the status data in the multicast group monitoring apparatus according to the embodiment of the present disclosure.

Referring to FIG. 7, the status data may include a propagation message, i.e., a first propagation message, and may further include a second propagation message to an m-th propagation message (where m is a natural number greater than or equal to 2). The first to m-th propagation messages preferably have the same format as the authenticated message. For example, when the first to m-th propagation messages are the unauthenticated messages or the tampered messages, the first to m-th propagation messages may have a format that is not the same as the authenticated message. The status data may further include identification information of the device that sends the propagation message. For example, the status data may further include identification information of the device sending the first propagation message. The identification information of the device may include socket information of the device, for example. The socket information includes network information such as the device addressing scheme, IP information and port information. The status data may further include the time at which the propagation message is received. For example, the status data may further include the time at which the first propagation message is received.

Figure 8:
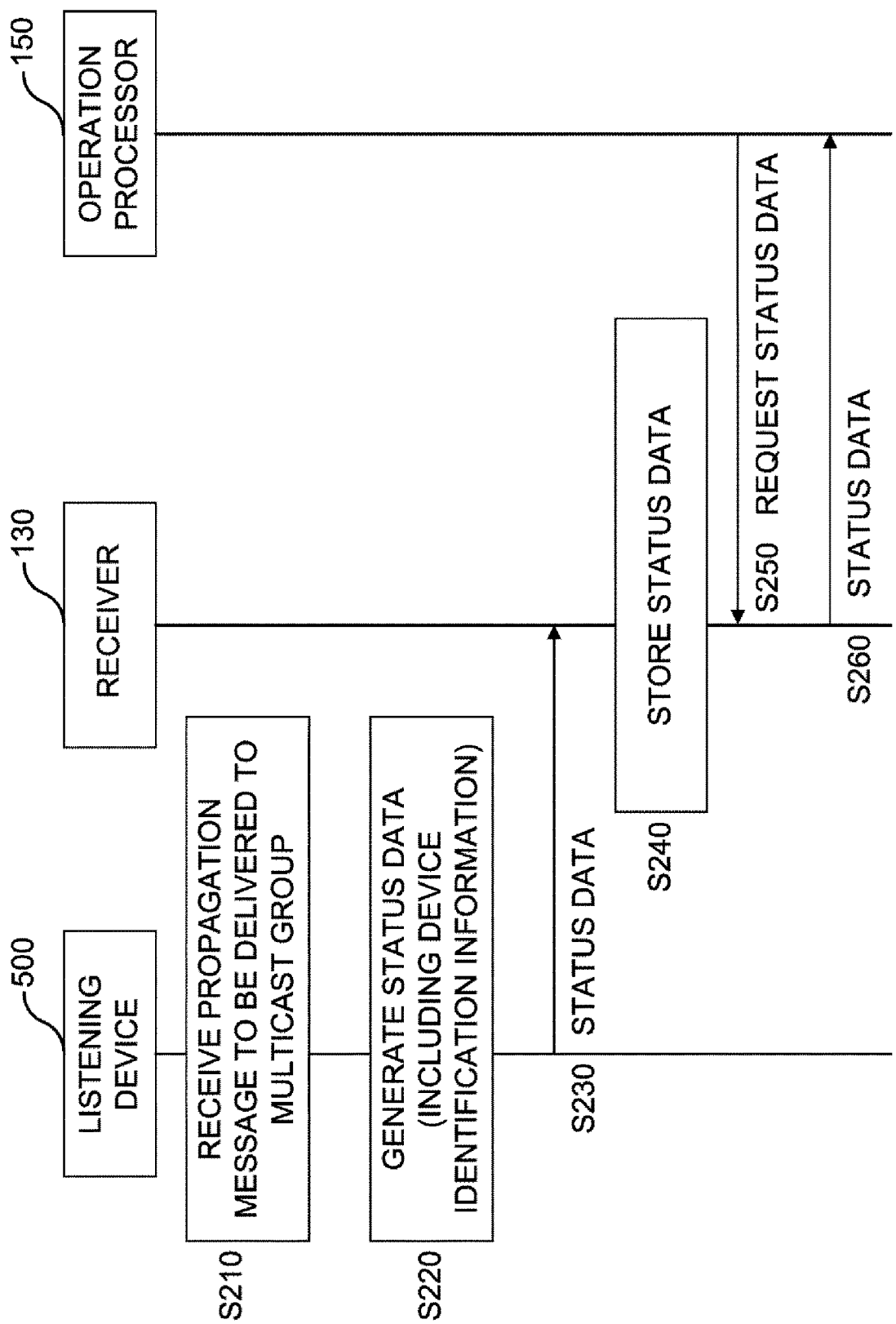
FIG. 8 shows an example of a process of acquiring the status data in the multicast group monitoring apparatus according to the embodiment of the present disclosure.

FIG. 8 shows an example of a process of acquiring status data in the multicast group monitoring apparatus according to the embodiment of the present disclosure.

Referring to FIG. 8, the listening device 500 receives a propagation message to be delivered to a multicast group (step S210). Then, the listening device 500 generates status data including the propagation message (step S220). More specifically, the status data may further include identification information of the device sending the propagation message. The status data may further include the time at which the propagation message is received. Next, the listening device 500 transmits the status data to the receiver 130 (step S230). Preferably, the listening device 500 is connected to the receiver 130 using the communication protocol of, e.g., a unicast type. When the status data from the listening device 500 is received to the receiver 130, the receiver 130 stores the status data (step S240). The operation processor 150 requests that the receiver 130 transmits the status data (step S250). When the request from the operation processor 150 is received to the receiver 130, the receiver 130 transmits the status data to the operation processor 150 (step S260).

Although the process of acquiring the status data has been described with reference to FIG. 8, the present disclosure is not limited thereto. For example, the receiver 130 may directly transmit the status data to the operation processor 150 after receiving the status data.

Referring back to FIG. 1, the apparatus 100 may further include the decoder 170. As described above, the multicast group 200 may use the group key and the message authentication code. Alternatively, the multicast group 200 may only use the group key. The decoder 170 decrypts the propagation message encrypted using the group key and the message authentication code or the propagation message encrypted using the group key. In addition, the decoder 170 may decrypt the first to n-th authenticated messages encrypted using the group key and the message authentication code or the first to n-th authenticated messages encrypted using the group key.

Referring back to FIG. 1, the operation processor 150 generate monitoring information including the status information of the multicast group 200 by using the status data received from the receiver 130 and the first to n-th data stored in the storage 110.

Figure 9:
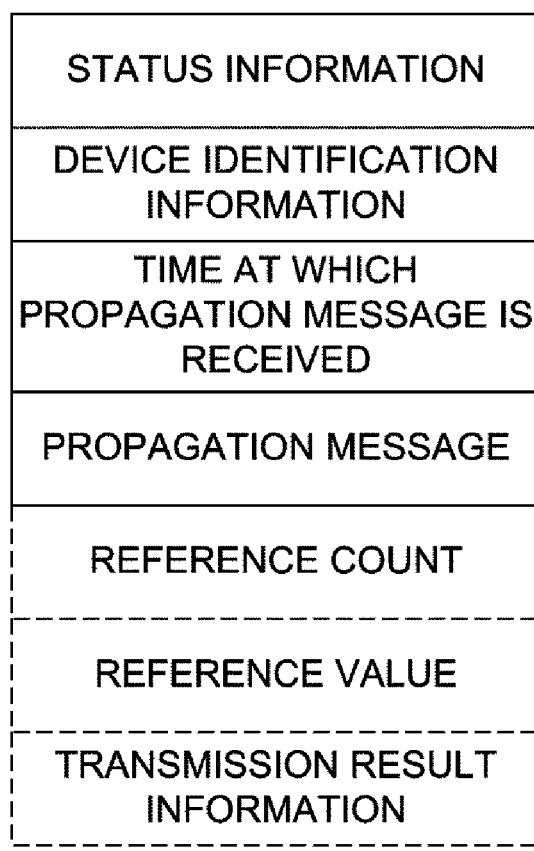
FIG. 9 shows an example of monitoring information in the multicast group monitoring apparatus according to the embodiment of the present disclosure.

FIG. 9 shows an example of the monitoring information in the multicast group monitoring apparatus according to the embodiment of the present disclosure.

Referring to FIG. 9, the monitoring information includes the status information of the multicast group 200. The monitoring information may further include at least one among identification information of a device transmitting a propagation message, the time at which the propagation message is received, and the propagation message. The monitoring information may further include at least one among reference count, a reference value, and transmission result information. The reference count, the reference value, and the transmission result information will be described later.

<Configuration of Operation Processor>

Hereinafter, the processing performed by the operation processor 150 will be described in more detail.

a) Processing According to the Result of Decrypting the Propagation Message

As described above, the multicast group 200 may use the group key and the message authentication code. Alternatively, the multicast group 200 may only use the group key. In other words, a message encrypted using the group key and the message authentication code or a message encrypted only using the group key may be delivered in the multicast group 200.

Figure 10:
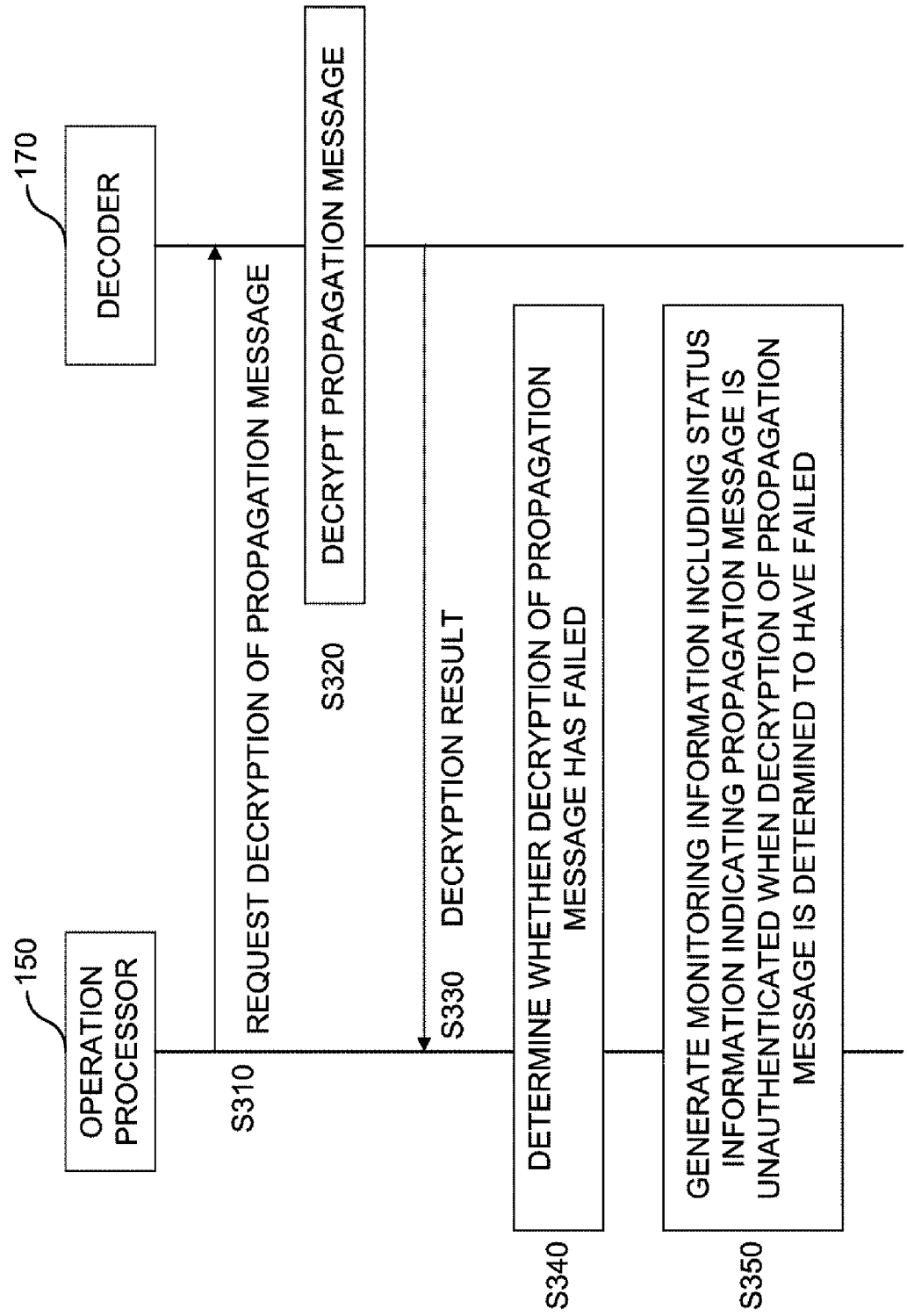
FIG. 10 shows an example of a process of generating monitoring information including status information in the multicast group monitoring apparatus according to the embodiment of the present disclosure.

FIG. 10 shows an example of a process of generating monitoring information including status information in the multicast group monitoring apparatus according to the embodiment of the present disclosure. More specifically, FIG. 10 exemplarily shows a process of generating the monitoring information according to a result of decrypting a propagation message.

The operation processor 150 requests that the decoder 170 decrypts the propagation message included in the status data, e.g., the first propagation message (step S310).

When the propagation message is received from the operation processor 150, the decoder 170 decrypts the propagation message (step S320) and transmits the decryption result to the operation processor 150 (step S330). Upon receiving the decryption result, the operation processor 150 determines whether or not the decryption of the propagation message has failed (step S340). For example, when the propagation message is encrypted using the group key and the message authentication code, the operation processor 150 may determine whether or not the propagation message is normally decrypted through the message authentication code. For example, when the propagation message is encrypted using the group key, the operation processor 150 may determine whether or not the propagation message is normally decrypted based on whether the propagation message is in a normal form. If it is determined in step S340 that the decryption of the propagation message has failed, the operation processor 150 generates monitoring information including status information indicating that the propagation message is an unauthenticated message.

For example, when an unauthorized device, such as the device 610 that is not aware of the group key and the message authentication code, transmits the message to the multicast group 200, the propagation message included in the status data is an unauthenticated message. By allowing the operation processor 150 to determine whether the decryption of the propagation message using the decoder 170 has failed or not, the transmission of the unauthenticated message can be confirmed.

Figure 11:
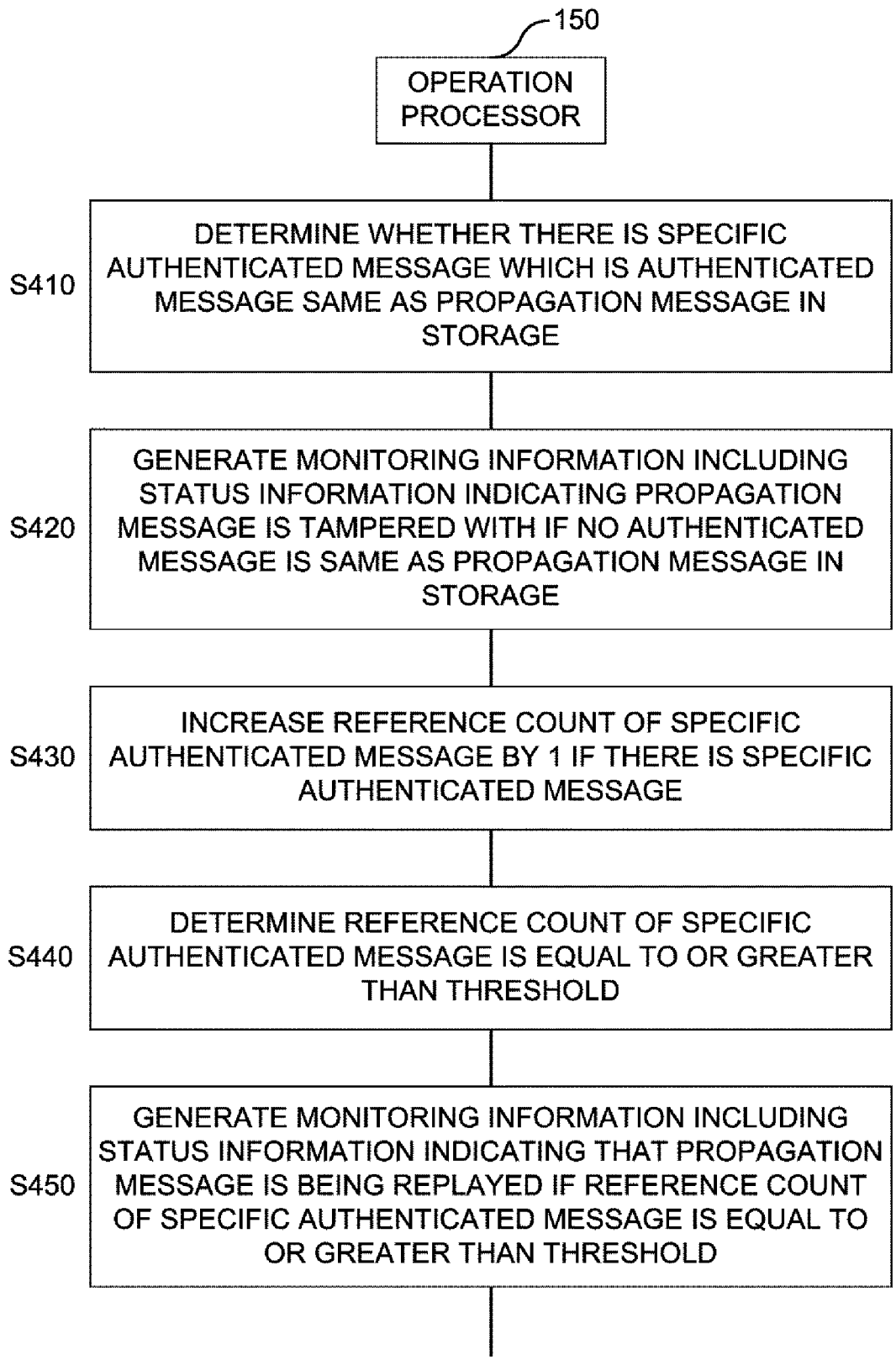
FIG. 11 shows an example of a process of generating monitoring information including status information in the multicast group monitoring apparatus according to the embodiment of the present disclosure.

As described above, the monitoring information may include the identification information of the device that transmits the propagation message. That is, the monitoring information may include the status information indicating that the propagation message is the unauthenticated message and the identification information of, e.g., the device 610 that transmits the unauthenticated message.

b) Processing Depending on the Presence of the Authenticated Message that is the Same as the Propagation Message FIG. 11 shows an example of a process of generating monitoring information including status information in the multicast group monitoring apparatus according to the embodiment of the present disclosure. More specifically, FIG. 11 exemplarily shows a process of generating the monitoring information depending on the presence of the authenticated message that is the same as the propagation message and a process of generating the monitoring information based on reference count.

The operation processor 150 determines whether or not there is an authenticated message that is the same as a propagation message, e.g., the first propagation message included in the status data, among the first to n-th authenticated messages stored in the storage 110 (step S410). If it is determined in step S410 that no authenticated message is the same as the propagation message, e.g., the first propagation message included in the status data, among the first to n-th authenticated messages stored in the storage 110, the operation processor 150 generates monitoring information including status information indicating that the propagation message is a tampered message (step S420).

For example, when the subscriber 630 transmits the tampered message, the monitoring information may include identification information of the device transmitting the propagation message as described above. That is, the monitoring information may include the status information indicating that the propagation message is the tampered message and the identification information of the subscriber 630 that is the device for transmitting the tampered message.

The "b) Processing depending on the presence of the authenticated message that is the same as the propagation message" may be particularly effective when the first to n-th authenticated messages are encrypted using the group key and the message authentication code.

As described above, the subscriber 630 is subscribed to the multicast group 200 when the subscriber 630 transmits the tampered message. Since both the group key and the message authentication code is provided to the subscriber 630, the subscriber 630 is able to encrypt the tampered message using the group key and the message authentication code. Therefore, even if the operation processor 150 performs the above-described "a) Processing according to the result of decrypting the propagation message," it cannot be easily confirmed that the propagation message has been tampered with.

However, according to the present embodiment, by comparing the first to n-th authenticated messages stored in the storage 110 with the propagation message transmitted by the subscriber 630, the operation processor 150 may easily confirm that the propagation message transmitted by the subscriber 630 has been tampered with.

c) Processing According to the Reference Count

As described above, each of the first to n-th data may further include reference count.

Referring back to FIG. 11, if it is determined in step S410 that there is the authenticated message that is the same as the propagation message, e.g., the first propagation message included in the status data, among the first to n-th authenticated messages stored in the storage 110, the reference count of the authenticated message that is the same as the propagation message is increased by 1 by the operation processor 150 (step S430).

For example, the device 650 is a device that is not subscribed but joined to the multicast group 200. The device 650 is configured to receive a propagation message to be delivered to the multicast group 200 and repeatedly replay the propagation message.

The operation processor 150 determines whether or not the reference count of the authenticated message, which is the same as the propagation message (e.g., the first propagation message included in the status data) among the first to n-th authenticated messages stored in the storage 110, is equal to or greater than a predetermined threshold (step S440). If it is determined in step S440 that the reference count of the authenticated message that is the same as the propagation message, e.g., the first propagation message is equal to or greater than the predetermined threshold, the operation processor 150 generates monitoring information including status information indicating that, for example, the first propagation message is being replayed (step S450).

The threshold may be specified in advance based on, for example, the number of subscribers subscribed to the multicast group 200 and the network environment information of the multicast group 200. For example, the threshold may be set to two. That is, if the same propagation message is delivered to the multicast group 200 twice or more, the operation processor 150 generates the monitoring information including the status information indicating that the propagation message, e.g., the first propagation message is being replayed. Further, for example, the threshold may be set to five. That is, if the same propagation message is delivered to the multicast group 200 five times or more, the operation processor 150 generates the monitoring information including the status information indicating that the propagation message, e.g., the first propagation message is being replayed.

For example, when the device 650 repeatedly replays the propagation message, the monitoring information may include identification information of the device transmitting the propagation message as described above. That is, the monitoring information may include the status information indicating that the propagation message, e.g., the first propagation message is being replayed and the identification information of the device 650 that repeatedly replays the first propagation message, for example.

The propagation message that the device 650 repeatedly replays is a normal message. Therefore, even when the operation processor 150 performs the "a) Processing according to the result of decrypting the propagation message" or the "b) Processing depending on the presence of the authenticated message that is the same as the propagation message," it cannot be easily confirmed that the propagation message is being replayed.

However, according to the present exemplary embodiment, by comparing the reference count with the threshold, the operation processor 150 may easily confirm that the propagation message transmitted by the subscriber 650 is being repeatedly replayed.

According to the above-described "a) Processing according to the result of decrypting the propagation message," "b) Processing depending on the presence of the authenticated message that is the same as the propagation message," and "c) Processing according to the reference count," the data integrity of the propagation message can be checked. In other words, it is confirmed that the propagation message is authenticated, not tampered with, and not replayed.

d) Processing According to Serial Number;

As described above, each of the first to n-th authenticated messages may further include the serial number. Similarly, the propagation message may further include the serial number.

The "d) Processing according to serial number" is performed after the data integrity of the propagation message is confirmed by, for example, the above-described "a) Processing according to the result of decrypting the propagation message," "b) Processing depending on the presence of the authenticated message that is the same as the propagation message," and "c) Processing according to the reference count."

Figure 12:
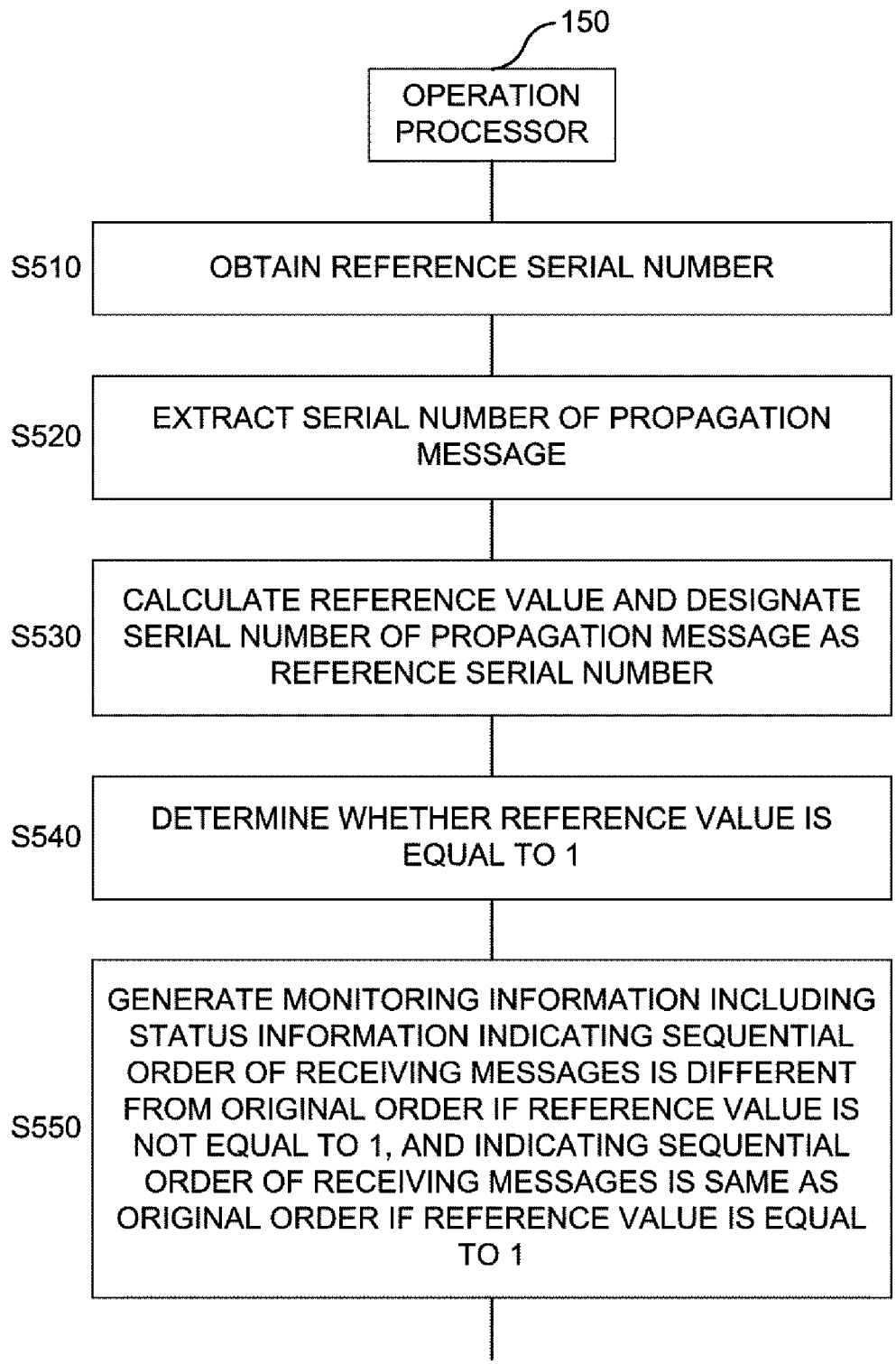
FIG. 12 shows an example of a process of generating monitoring information including status information in the multicast group monitoring apparatus according to the embodiment of the present disclosure.

FIG. 12 shows an example of a process of generating monitoring information including status information in the multicast group monitoring apparatus according to the embodiment of the present disclosure. More specifically, FIG. 12 exemplarily shows a process of generating monitoring information based on a serial number.

First, the operation processor 150 obtains a reference serial number (step S510). The reference serial number is the serial number of the latest propagation message of which the data integrity is lately confirmed by the operation processor 150 before the current propagation message is processed by the operation processor 150 to confirm the data integrity. For example, it is assumed that the data integrity of the first propagation message is confirmed based on the above-described "a) Processing according to the result of decrypting the propagation message," "b) Processing depending on the presence of the authenticated message that is the same as the propagation message," and "c) Processing according to the reference count," and then the data integrity of the second propagation message is confirmed by the operation processor 150 based on the above-described "a) Processing according to the result of decrypting the propagation message," "b) Processing depending on the presence of the authenticated message that is the same as the propagation message," and "c) Processing according to the reference count," for example. In this case, the reference serial number is the serial number of the first propagation message when the operation processor 150 performs the "d) Processing according to the serial number" for the second propagation message.

Next, the operation processor 150 extracts the serial number of the propagation message (step S520). For example, the operation processor 150 extracts the serial number of the second propagation message.

Next, the operation processor 150 calculates a reference value by subtracting the reference serial number from the serial number of the propagation message, and designates the serial number of the propagation message as the reference serial number (step S530). For example, the operation processor 150 calculates the reference value by subtracting the reference serial number from the serial number of the second propagation message, and designates the serial number of the second propagation message as the reference serial number (step S530). The reference serial number is updated by executing step S530.

In another case, there may be the case where the reference serial number is not designated that is, for example, the case where there is no latest propagation message of which the data integrity is lately confirmed by the operation processor 150 before the current propagation message is processed by the operation processor 150 to confirm the data integrity. For example, in the case of processing the first propagation message, the propagation message whose data integrity is confirmed by the operation processor 150 before the first propagation message is processed may not exist. If the reference serial number is not designated, the reference value may be set to "1" in step S530.

Alternatively, the initial value of the reference serial number may be set to a value obtained by subtracting "1" from the serial number of the first authenticated message. In other words, when the aforementioned reference value for the first propagation message is calculated, the operation processor 150 may calculate the reference value by subtracting the initial value of the reference serial number from the serial number of the first propagation message. Specifically, if the first propagation message is the same as the first authenticated message and the initial value of the reference serial number is a value obtained by subtracting "1" from the serial number of the first authenticated message, the calculated reference value becomes equal to "1." If the first propagation message is not the same as the first authenticated message but the same as, e.g., the second authenticated message (here, the serial number of the second authenticated message is greater than the serial number of the first authenticated message by "1") and if the initial value of the reference serial number is the value obtained by subtracting "1" from the serial number of the first authenticated message, the calculated reference value becomes equal to "2" and not equal to "1."

Next, the operation processor 150 determines whether or not the reference value calculated in step S530 is equal to "1" (step S540). If it is determined in step S540 that the reference value is not equal to "1," the operation processor 150 generates monitoring information including status information indicating that the sequential order of receiving messages in the multicast group 200 is different from the original order (step S550). That is, the operation processor 150 generates monitoring information including status information indicating that the data integrity of the propagation message is confirmed but the sequential order in which the messages are received by the device in the multicast group 200 is different from the original order. More specifically, the operation processor 150 generates the monitoring information including the status information indicating that the sequential order in which the messages are received by the device in the multicast group 200 is different from the sequential order in which the messages are originally transmitted by the message transmission device 350.

If it is determined in step S550 that the reference value is equal to "1," the operation processor 150 generates monitoring information including status information indicating that the sequential order of receiving messages in the multicast group 200 is the same as the original order (step S550). That is, the operation processor 150 generates monitoring information including status information indicating that the data integrity of the propagation message is confirmed and the sequential order in which the messages are received by the device in the multicast group 200 is the same as the original order. More specifically, the operation processor 150 generates the monitoring information including the status information indicating that the sequential order in which the messages are received by the device in the multicast group 200 is the same as the sequential order in which the messages are originally transmitted by transmission device 350 (step S550).

For example, if the first propagation message is the same as the first authenticated message and the second propagation message is the same as the second authenticated message, the reference value is equal to "1." That is, the first authenticated message is first transmitted to the listening device 500 in the multicast group 200, and then the second authenticated message is transmitted to the listening device 500 in the multicast group 200. Therefore, when the reference value is equal to "1," the sequential order of receiving messages in the multicast group 200 may be determined to be the same as the original order.

If the first propagation message is the same as the first authenticated message and the second propagation message is the same as the fourth authenticated message, the reference value is equal to "3." If the sequential order of receiving the messages in the multicast group 200 is the same as the original order, the first authenticated message is first transmitted to the listening device 500 in the multicast group 200, and then the second authenticated message is transmitted to the listening device 500 in the multicast group 200. However, in the above case, after the first authenticated message is transmitted to the listening device 500 in the multicast group 200, the fourth authenticated message is then transmitted. Therefore, when the reference value is equal to "3," it can be determined that the sequential order of receiving messages in the multicast group 200 is different from the original order. In other words, it is indicated that the second authenticated message and the third authenticated message are missing in the transmission between the first authenticated message and the fourth authenticated message in the process of transmitting the authenticated messages to the multicast group 200.

If the first propagation message is the same as the fourth authenticated message and the second propagation message is the same as the first authenticated message, the reference value is equal to "−3." If the sequential order of receiving the messages in the multicast group 200 is the same as the original order, the first authenticated message is first transmitted to the listening device 500 in the multicast group 200, and then the second authenticated message is transmitted to the listening device 500 in the multicast group 200. However, in the above case, after the fourth authenticated message is transmitted to the listening device 500 in the multicast group 200, the first authenticated message is then transmitted. Therefore, when the reference value is equal to "−3," it can be determined that the sequential order of receiving messages in the multicast group 200 is different from the original order. In other words, it is indicated that, in the process of transmitting the authenticated messages to the multicast group 200, the fourth authenticated message to be transmitted later is delivered earlier than the first authenticated message that is supposed to be transmitted before the fourth authenticated message.

Meanwhile, if the reference value is equal to "0," it is indicated that the first propagation message is the same as the first authenticated message and the second propagation message is the same as the first authenticated message, for example. In other words, it is indicated that the first authenticated message is being replayed. When the reference value is equal to "0," it may be processed through the above-described "c) Processing according to the reference count."

In view of the above, when the reference value is not equal to "1," the operation processor 150 generates the monitoring information including the status information indicating that the data integrity of the propagation message is confirmed but the sequential order of receiving the messages in the multicast group 200 is different from the original order. When the reference value is equal to "1," the operation processor 150 generates the monitoring information including the status information indicating that the data integrity of the propagation message is confirmed and the sequential order of receiving the messages in the multicast group 200 is the same as the original order.

Meanwhile, the monitoring information may further include an additional reference value. The reference value may be used as data for identifying the communication state in the multicast group 200, that is, data for determining whether or not the sequential order of receiving messages in the multicast group 200 is the same as the original order.

e) Processing According to the Serial Numbers of the Propagation Messages Received During a Predetermined Time Period As described above, each of the first to n-th data may further include the serial number.

Similarly, the propagation message may further include the serial number.

The "e) Processing according to the serial numbers of the propagation messages received during a predetermined time period" is performed after the data integrity of the propagation message is confirmed by, for example, the above-described "a) Processing according to the result of decrypting the propagation message," "b) Processing depending on the presence of the authenticated message that is the same as the propagation message," and "c) Processing according to the reference count."

Figure 13:
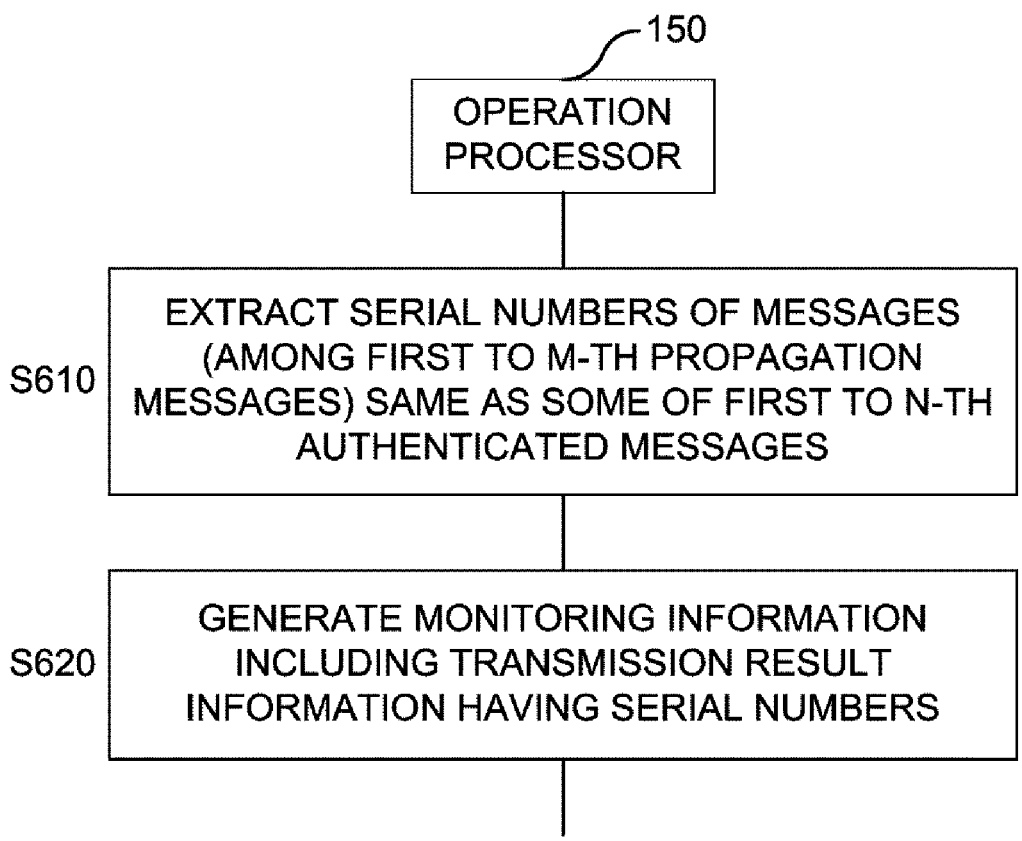
FIG. 13 shows an example of a process of generating monitoring information including transmission result information in the multicast group monitoring apparatus according to the embodiment of the present disclosure.

FIG. 13 shows an example of a process of generating monitoring information including status information in the multicast group monitoring apparatus according to the embodiment of the present disclosure. More specifically, FIG. 13 exemplarily shows a process of generating monitoring information based on the serial numbers of the propagation messages received during the predetermined time period.

The operation processor 150 extracts the serial numbers of propagation messages that are the same as the first to n-th authenticated messages among first to the m-th propagation messages (where m is a natural number of two or more) included in one or more status data received from the receiver 130 during a predetermined time period (step S610).

The propagation messages that are the same as the first to n-th authenticated messages among the first to m-th propagation messages are the messages of which the data integrity is confirmed by performing the above-described "a) Processing according to the result of decrypting the propagation message," "b) Processing depending on the presence of the authenticated message that is the same as the propagation message," and "c) Processing according to the reference count."

The predetermined time period may be determined in advance based on, for example, the network environment information of the multicast group 200. For example, the predetermined time period may be set to one minute. Next, the operation processor 150 generates monitoring information including the transmission result information having the serial numbers extracted in step S610 (step S620).

The transmission result information may be used to confirm an authenticated message that is not transmitted to the multicast group 200 among the first to n-th authenticated messages.

<Implementation Example of the Operation Processor>

Hereinafter, an implementation example of the operation processor will be described based on the above-described processes.

FIG. 14 is a flowchart showing an example of a process of generating monitoring information by the operation processor in the multicast group monitoring apparatus according to the embodiment of the present disclosure.

In the flowchart shown in FIG. 14, it is assumed that the propagation message is encrypted using the group key and the message authentication code and includes the serial number.

First, the operation processor 150 determines whether or not there is a propagation message to be received (step S1000).

When there is the propagation message to be received, step S1100 is executed. When there is no propagation message to be received, the process of generating the monitoring information by the operation processor is terminated.

When there is the propagation message to be received, the operation processor 150 receives the propagation message (step S1100). For example, status data is received through steps S250 and S260 described above, and the propagation message, e.g., the first propagation message is received from the received status data.

Next, the operation processor 150 determines whether or not the propagation message is normally decrypted (step S1200). In other words, the above-described "a) Processing according to the result of decrypting the propagation message" is performed to determine whether or not the propagation message is normally decrypted.

If it is determined that the propagation message is not normally decrypted, the operation processor 150 generates monitoring information including status information indicating that the propagation message is an unauthenticated message (step S1250). After the execution of step S1250, the process proceeds to step S1000. For example, it is assumed that the status data includes the first propagation message and the second propagation message and the operation processor 150 receives the first propagation message. If it is determined in step S1200 that the first propagation message is not normally decrypted, the operation processor 150 generates the monitoring information in step S1250 and then proceeds to step S1100 again through step S1000. That is, since the second propagation message has not been processed, the operation processor 150 receives the second propagation message through step S1100 and determines whether or not the second propagation message is normally decrypted in step S1200.

If the propagation message is not encrypted using the group key or the group key and the message authentication code, steps S1200 and S1250 are omitted and step S1300 is executed after step S1100.

Next, if it is determined that the propagation message is normally decrypted, the operation processor 150 determines whether or not there is the authenticated message that is the same as the propagation message among the first to n-th authenticated messages stored in the storage 110 (step S1300). In other words, the above-described "b) Processing depending on the presence of the authenticated message that is the same as the propagation message" is performed to determine whether or not there is the authenticated message that is the same as the propagation message in the storage 110.

If it is determined that no authenticated message is the same as the propagation message in the storage 110, the operation processor 150 generates monitoring information including status information indicating that the propagation message is a tampered message (step S1350). Then, the process proceeds to step S1000.

If it is determined that there is the authenticated message that is the same as the propagation message in the storage 110, the operation processor 150 determines whether or not the reference count of the propagation message is equal to or greater than the threshold (step S1400). In other words, the above-described "c) Processing according to the reference count" is performed to determine whether or not the reference count of the propagation message is equal to or greater than the threshold. More specifically, the operation processor 150 determines whether or not the reference count of the authenticated message, which is the same as the propagation message (e.g., the first propagation message) among the first to n-th authenticated messages, is greater than or equal to the predetermined threshold. The detailed description of the reference count will be omitted since it is described in the description of "c) Processing according to the reference count."

If the reference count of the propagation message is equal to or greater than the threshold, the operation processor 150 generates monitoring information including status information indicating that the propagation message is being replayed (step S1450). Then, the process proceeds to step S1000.

If, in step 1400, the reference count of the propagation message is less than the threshold, the data integrity of the propagation message is confirmed. Thereafter, the operation processor 150 determines whether or not the sequential order of receiving messages in the multicast group 200 is the same as the original order. In other words, if the reference count of the propagation message is less than the threshold, the operation processor 150 determines whether or not the reference value obtained by subtracting the reference serial number from the serial number of the propagation message is equal to "1" (step S1500). That is, the above-mentioned "d) Processing according to serial number" is performed to determine whether or not the reference value is equal to "1." The detailed description of the reference serial number will be omitted since it is described in the description of "d) Processing according to serial number." For example, when the reference serial number is not designated, the reference value can be set to "1" as described above.

If the reference value is not equal to "1" in step S1500, the operation processor 150 generates monitoring information including status information indicating that the sequential order of receiving messages in the multicast group 200 is not the same as the original order (step S1550). Then, the process proceeds to step S1000.

If, in step S1500, the reference value is equal to "1", the operation processor 150 generates monitoring information including status information indicating that the propagation message is normal (step S1600). Specifically, the operation processor 150 generates the monitoring information including the status information indicating that the data integrity of the propagation message is confirmed and the sequential order of receiving the messages in the multicast group 200 is the same as the original order. More specifically, the operation processor 150 generates the monitoring information including the status information indicating that the sequential order of receiving the messages in the multicast group 200 is the same as the original order when the propagation message is normally decrypted, the authenticated message that is the same as the propagation message exists in the storage 110, the reference count of the authenticated message that is the same as the propagation message is less than the predetermined threshold, and the reference value is equal to "1."

On the other hand, if the propagation message does not include the serial number, step S1600 is executed immediately after step S1400. If the propagation message does not include the serial number, the operation processor 150 generates monitoring information including status information indicating that the propagation message is normal, more specifically, that the data integrity of the propagation message is confirmed when the propagation message is normally decrypted, the authenticated message that is the same as the propagation message exists in the storage 110, the reference count of the authenticated message that is the same as the propagation message is less than a predetermined threshold.

After the execution of step S1600, step S1000 is executed. If it is determined in step S1000 that the propagation message to be received remains, step S1100 is executed again. If it is determined that there is no propagation message to be received, the process performed by the operation processor 150 is terminated.

With the aforementioned processes according to the embodiment of the present disclosure, the manager or the management apparatus of the multicast group is capable of (i) easily detecting unauthorized messages and easily identifying the devices sending the unauthenticated messages; (ii) easily detecting tampered messages and easily identifying the malicious subscribers sending the tampered messages; (iii) easily detecting the replay of the messages and easily identifying the malicious subscribers or the malicious devices replaying the messages repeatedly; (iv) easily confirming whether or not the messages are transmitted in the original order and easily identifying missing messages in the course of transmission; and (v) easily confirming the data integrity of the messages. Therefore, the status of the multicast group can be easily checked.

Although various examples according to the embodiment of the present disclosure have been described in detail, the above descriptions merely illustrates the technical idea of the present disclosure, and it will be understood by those skilled in the art to which this present disclosure belongs that various changes and modifications may be made without departing from the scope of the essential characteristics of the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

In accordance with the embodiment of the present disclosure, there is provided the multicast group monitoring apparatus capable of monitoring various abnormal conditions that occurs in the multicast group such as the transmission of messages from the unauthorized devices, the tampering of messages, the replay of messages, the loss of messages, and the difficulty in checking status in the multicast group.

More specifically, with the embodiment of the present disclosure, the administrator or the management apparatus of the multicast group is capable of (i) easily detecting unauthorized messages and easily identifying the devices sending the unauthenticated messages; (ii) easily detecting tampered messages and easily identifying the malicious subscribers sending the tampered messages; (iii) easily detecting the replay of the messages and easily identifying the malicious subscribers or the malicious devices replaying the messages repeatedly; (iv) easily confirming whether or not the messages are transmitted in the original order and easily identifying missing messages in the course of transmission; and (v) easily confirming the data integrity of the messages. Therefore, the status of the multicast group can be easily checked.

In addition, the administrator or management apparatus can easily manage the multicast group by restricting access of the unauthorized devices, the malicious devices, and the malicious subscribers and further can request that the publisher sends the message again to the subscriber when the message is lost or the message is defective.

<Description of Reference Numerals>

| | |
|---|---|
| 100: multicast group monitoring apparatus | |
| 110: storage | 130: receiver |
| 150: operation processor | 200: multicast group |
| 300, 310: publisher | 350: message transmission device |
| 400: subscriber | 500: listening device |
| 610: device | 630: subscriber |
| 650: device | |

What is claimed is:

1. An apparatus for monitoring a multicast group, comprising:
    a storage configured to store first data to n-th data including a first authenticated message to a n-th authenticated message, where each of the first to n-th authenticated messages is authenticated as being published by a publisher of the multicast group and is received from the publisher or a message transmission device by using communication protocol whose communication speed is faster than a communication speed at which a first propagation message is transmitted to the multicast group, where n is a natural number equal to or greater than 2, and the first to n-th data are transferred to and stored in the storage;
    a receiver configured to receive status data including the first propagation message to be delivered to the multicast group after the first to n-th data are stored in the storage; and
    an operation processor configured to generate monitoring information including status information of the multicast group by comparing the status data with the first to n-th data,
    wherein the operation processor is further configured to generate the monitoring information including the status information indicating that the first propagation message is tampered with if no authenticated message, among the first authenticated message to the n-th authenticated message, is same as the first propagation message.

2. The apparatus of claim 1, wherein the status data further includes at least one among: identification information of a device by which the first propagation message is transmitted, and time information indicating time at which the first propagation message is received.

3. The apparatus of claim 2, wherein the identification information includes socket information of the device.

4. The apparatus of claim 1, wherein the monitoring information further includes at least one among: identification information of a device by which the first propagation message is transmitted, time information indicating time at which the first propagation message is received, and the first propagation message.

5. The apparatus of claim 1, wherein each of the first data to the n-th data includes a reference count, and
the operation processor is further configured to:
increase the reference count of a specific authenticated message by 1, the specific authenticated message, which is one among the first authenticated message to the n-th authenticated message, being same as the first propagation message; and
generate the monitoring information including the status information indicating that the first propagation message is being replayed if the reference count of the specific authenticated message is equal to or greater than a predetermined threshold.

6. The apparatus of claim 5, wherein the monitoring information further includes the reference count.

7. The apparatus of claim 1, wherein the first authenticated message to the n-th authenticated message further include serial numbers of the first message to the n-th message, respectively, each of the serial numbers indicating a sequential order in which a k-th message included in a k-th authenticated message is generated (where 1≤k≤n), and
the operation processor is further configured to:
obtain a reference serial number;
obtain a serial number of the first propagation message if there is an authenticated message, among the first to n-th authenticated messages, that is same as the first propagation message;
calculate a reference value by subtracting the reference serial number from the serial number of the first propagation message and designate the serial number of the first propagation message as the reference serial number;
determine whether or not the reference value is equal to 1;
generate, if the reference value is not equal to 1, the monitoring information including the status information indicating that a sequential order of receiving messages in the multicast group is different from an original order; and
generate, if the reference value is equal to 1, the monitoring information including the status information indicating that the sequential order of receiving the messages in the multicast group is same as the original order.

8. The apparatus of claim 7, wherein the monitoring information further includes the reference value.

9. The apparatus of claim 1, wherein the monitoring information further includes transmission result information including serial numbers of specific propagation messages among the first propagation message to a m-th propagation message (where m≥2), wherein each of the specific propagation messages is same as one among the first authenticated message to the n-th authenticated message and is included in one or more status data received by the operation processor through the receiver during a predetermined time period.

10. The apparatus of claim 1, wherein the first to n-th authenticated messages are received from the message transmission device, and
the message transmission device is configured to:
receive each of a first message to an n-th message from the publisher, the first message to the n-th message being included respectively in the first authenticated message to the n-th authenticated message;
assign a serial number to each of the first message to the n-th message;
generate the first authenticated message to the n-th authenticated message by encrypting the first message to the n-th message by using a group key of the multicast group; and
transmit the first authenticated message to the n-th authenticated message to the multicast group.

11. The apparatus of claim 10, wherein the operation processor or the storage is connected to the message transmission device by using the communication protocol whose communication speed is faster than the communication speed at which the first propagation message is transmitted in the multicast group.

12. The apparatus of claim 1, wherein the first authenticated message to the n-th authenticated message are received from a message transmission device, and
the message transmission device is configured to:
receive each of a first message to an n-th message from the publisher, the first message to the n-th message being included respectively in the first authenticated message to the n-th authenticated message;
assign a serial number to each of the first message to the n-th message;
generate the first authenticated message to the n-th authenticated message by encrypting the first message to the n-th message by using a group key and a message authentication code of the multicast group; and
transmit the first authenticated message to the n-th authenticated message to the multicast group.

13. The apparatus of claim 12, wherein the operation processor or the storage is connected to the message transmission device by using the communication protocol whose communication speed is faster than the communication speed of the multicast group.

14. The apparatus of claim 1, further comprising:
a decoder configured to decrypt data using a group key of the multicast group,
wherein the operation processor generates the monitoring information by using decrypted messages obtained by the decoder decrypting the first authenticated message to the n-th authenticated message and the first propagation message.

15. The apparatus of claim 1, further comprising:
a decoder configured to decrypt data using a group key and a message authentication code of the multicast group,
wherein the operation processor generates the monitoring information by using decrypted messages obtained by the decoder decrypting the first authenticated message to the n-th authenticated message and the first propagation message.

16. The apparatus of claim 14, wherein, if the decoder fails to decrypt the first propagation message, the operation processor generates the monitoring information including the status information indicating that the first propagation message is an unauthenticated message.

17. The apparatus of claim 15, wherein, if the decoder fails to decrypt the first propagation message, the operation processor generates the monitoring information including the status information indicating that the first propagation message is an unauthenticated message.

18. The apparatus of claim 1, wherein the status data is received from a listening device subscribed or joined to the multicast group.

\* \* \* \* \*